US012136298B1

(12) United States Patent
Koncz

(10) Patent No.: US 12,136,298 B1
(45) Date of Patent: Nov. 5, 2024

(54) SECURE VOTING SYSTEM AND METHOD

(71) Applicant: Tibor A Koncz, Monroe, WA (US)

(72) Inventor: Tibor A Koncz, Monroe, WA (US)

( * ) Notice: Subject to any disclaimer, the term of this patent is extended or adjusted under 35 U.S.C. 154(b) by 31 days.

(21) Appl. No.: 18/123,275

(22) Filed: Mar. 18, 2023

Related U.S. Application Data

(60) Provisional application No. 63/431,672, filed on Dec. 10, 2022.

(51) Int. Cl.
*G07C 13/00* (2006.01)

(52) U.S. Cl.
CPC .................................... *G07C 13/00* (2013.01)

(58) Field of Classification Search
CPC ............................ G07C 13/00; G06Q 2230/00
USPC .................................................. 235/51, 50 A
See application file for complete search history.

(56) References Cited

U.S. PATENT DOCUMENTS

| | | | | |
|---|---|---|---|---|
| 5,878,399 A * | 3/1999 | Peralto | G07C 13/00 | 235/386 |
| 6,951,303 B2 * | 10/2005 | Petersen | G07C 13/00 | 235/386 |
| 10,332,329 B1 * | 6/2019 | Ekimov | G07C 13/02 | |
| 2003/0158775 A1 * | 8/2003 | Chaum | G07C 13/00 | 705/12 |
| 2007/0095909 A1 * | 5/2007 | Chaum | G07C 13/00 | 235/386 |
| 2008/0035728 A1 * | 2/2008 | Peterson | G07C 13/00 | 235/386 |
| 2014/0244512 A1 * | 8/2014 | Liesenfelt | G06F 21/32 | 705/51 |
| 2017/0011576 A1 * | 1/2017 | Scotson | H04L 63/0861 | |
| 2017/0178438 A1 * | 6/2017 | Correa Parker | G07C 13/00 | |
| 2018/0350180 A1 * | 12/2018 | Onischuk | G07C 13/00 | |
| 2021/0150542 A1 * | 5/2021 | Loyd | G06K 7/1413 | |
| 2022/0156757 A1 * | 5/2022 | Loyd | G06K 7/1417 | |
| 2023/0096614 A1 * | 3/2023 | Lyon | G07C 13/00 | 235/51 |

* cited by examiner

*Primary Examiner* — Paultep Savusdiphol
(74) *Attorney, Agent, or Firm* — Joseph Z. Ellsworth

(57) ABSTRACT

A secure voting system with a secure and current voter registration system with each voter in a state voter database. The ballot in this voting system allows a voter to verifying that their votes were counted correctly and only counted one time. The ballot has a primary ballot identification number plus 3 digits, and a Secondary Graphical Identification number, that secretly connects a voter to a ballot so that only the voter can anonymously check their vote online.

18 Claims, 10 Drawing Sheets

SECURE VOTING SYSTEM AND METHOD

RELATED APPLICATIONS

This application claims benefit of U.S. Provisional Application No. 63/431,672 filed Dec. 10, 2022, entitled "Method for Voting having Vote Tracking without Revealing Voter Identity," which is hereby incorporated by reference.

TECHNICAL FIELD

The present invention relates to a voting solution, and more particularly, to a secure registration and voting solution process providing secure identification and authentication, voter registration, ballot creation, and vote tracking without revealing the voters identity.

BACKGROUND ART

Nearly every major election since 2000 has been disputed by one political party or another and this practice culminated in the 2016 federal election being fiercely disputed through lawsuits and protests across the country and in the capitol. Some of the claims of those against certifying the 2016 election were: (1) Ballots were sent out to all registered voters without verifying the voter was still at the address, (2) Ballots were being either illegally voted or illegally harvested or both and (3) electronic voting machines were changing votes, not counting votes or double counting votes.

SUMMARY

Many of the drawbacks of the prior art are remedied by a voting system having a secure and current voter registration system with a ballot having a means for verifying that the votes were counted correctly, and a state voter database including all registered voters.

Further, A method for securely voting may include providing a secure and current voter registration system and verifying that votes were counted correctly using a portion of a ballot, and recording all registered voters on a state voter database. The voter may choose a primary ballot identification number and vote the voting portion of the ballot. The voter then handwrites the primary ballot identification number and coded votes on the removable stub.

The voter may choose a Secondary Graphical Identification number using letters and numbers handwritten in the space provided between the removable stub and the voting portion of the ballot to create an unbreakable relationship between the voting portion and the removable stub of the ballot, known only to the voter. Further, the method may include requiring a fully finished voting ballot be brought in person to a polling location to make the voting process efficient. and scanning a registered serial number in a removable stub. The serial number May be matched to the state voter database and then activating the voter in the database.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION OF THE PREFERRED EMBODIMENT

Figure 1:
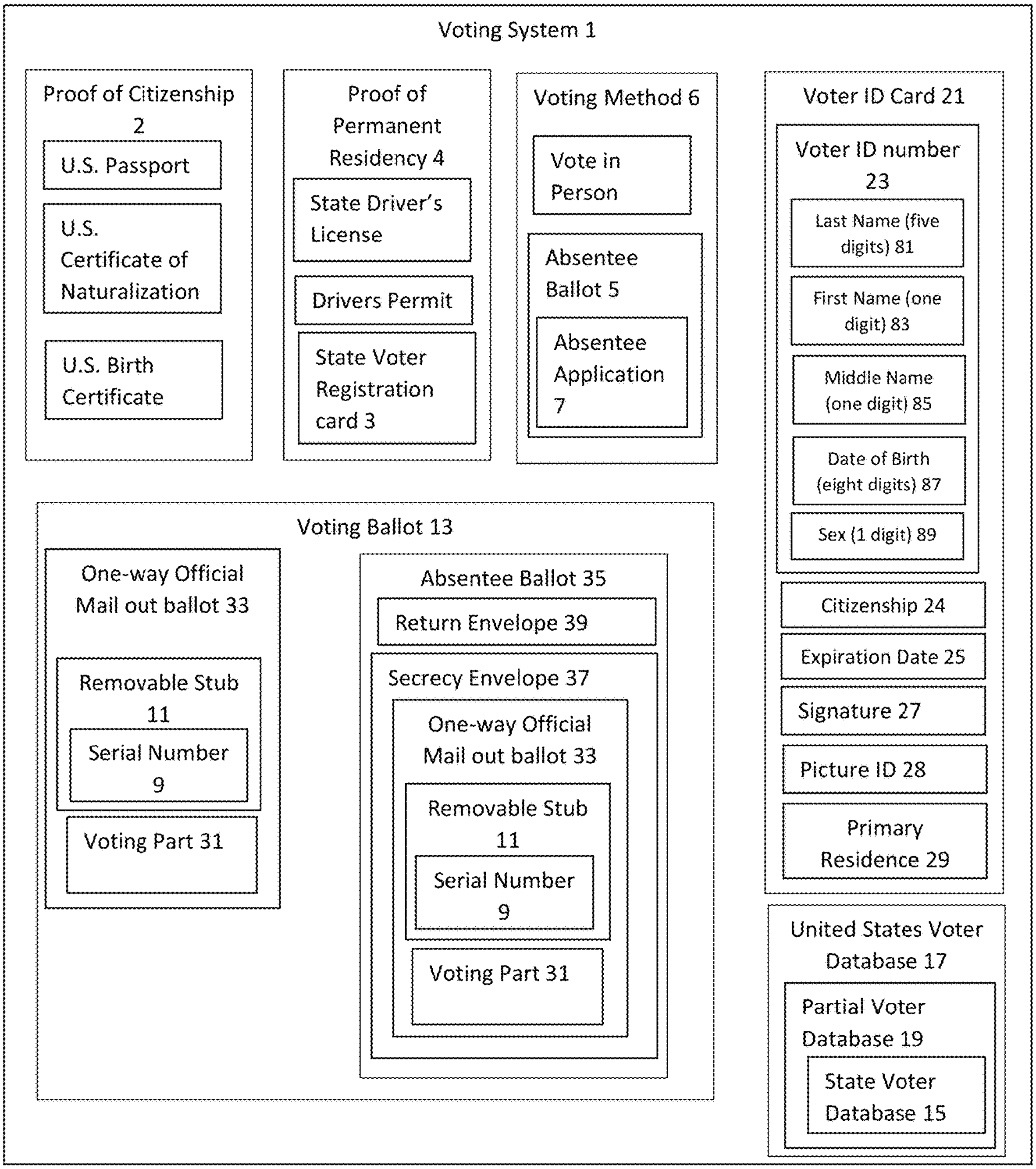
FIG. 1. Is a box diagram of the connection between the relevant portions of the invention.
Figure 2:
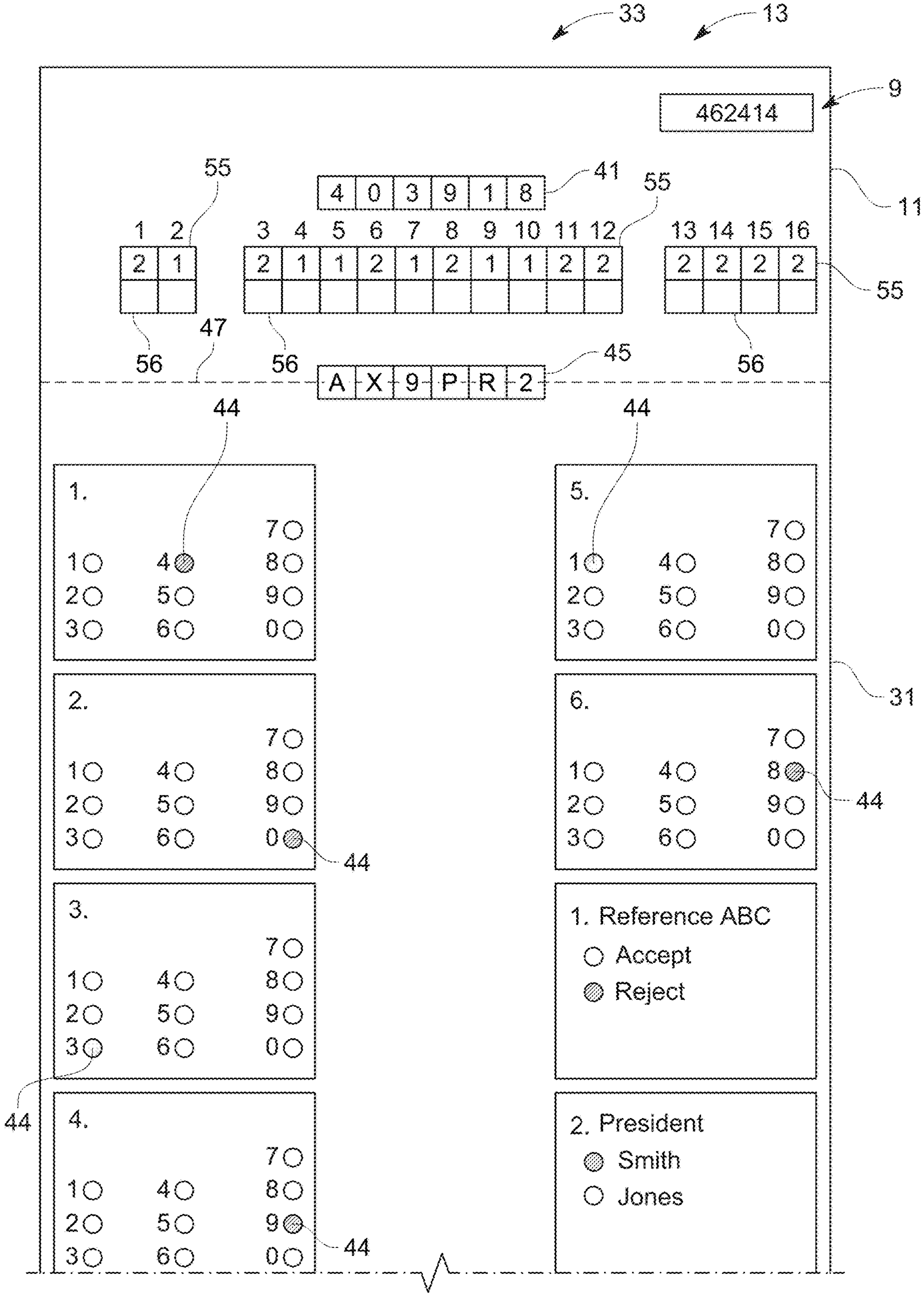
FIG. 2. Is a one-way official mailout ballot with the voting portion and the removable stub still connected at the perforated line.
Figure 3:
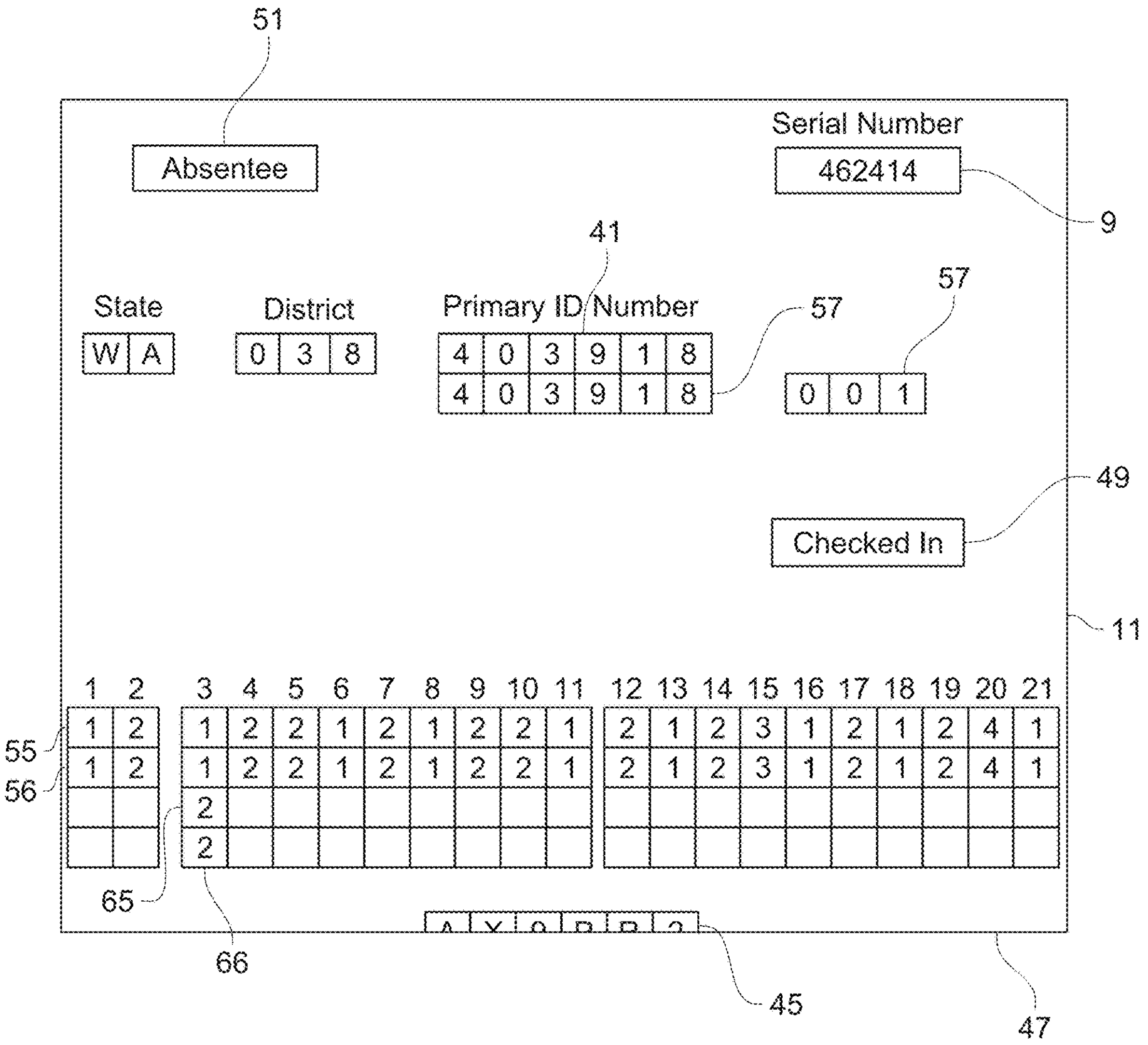
FIG. 3. Is a removable stub that has been removed from the voting portion of the ballot.
Figure 4:
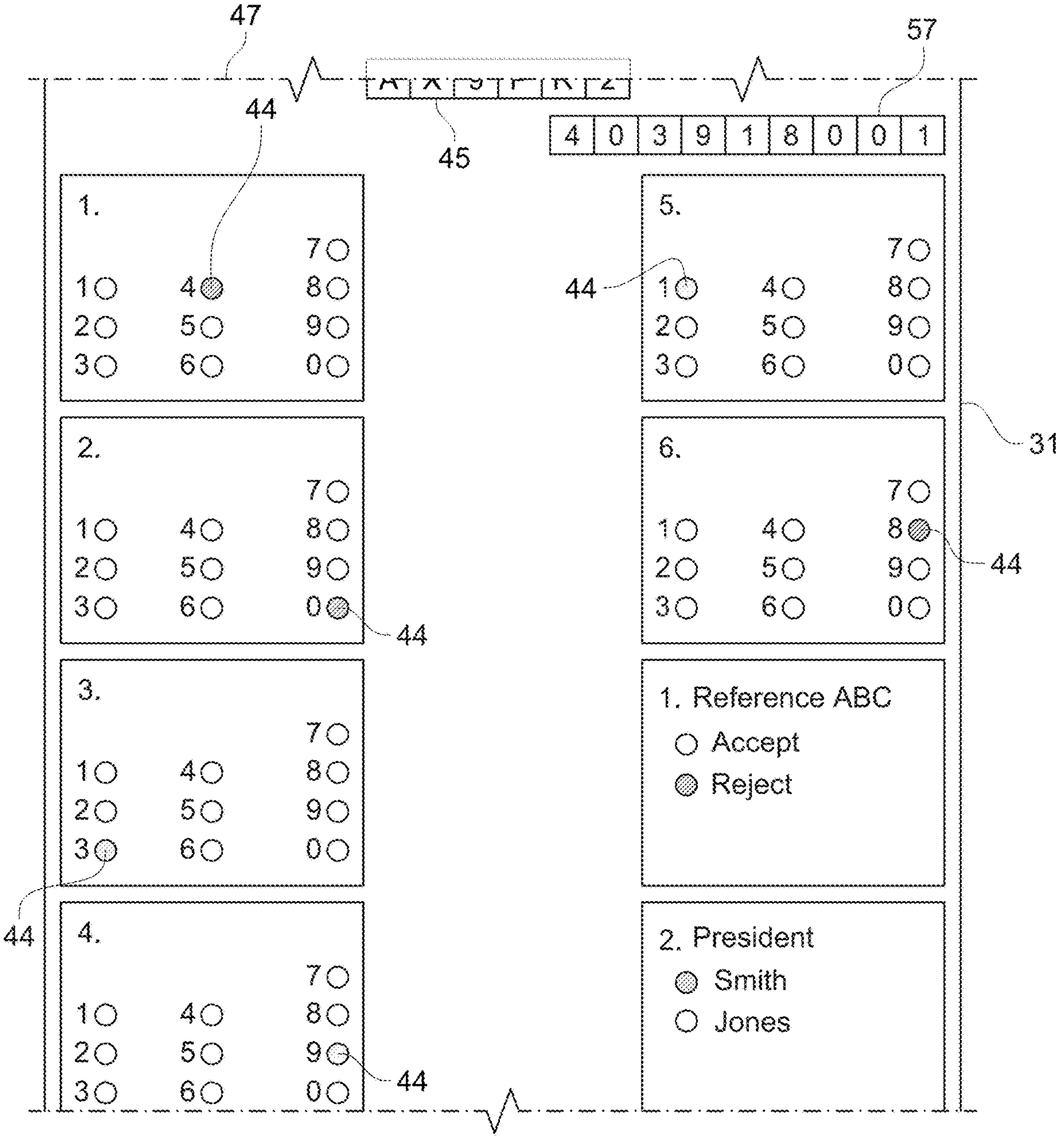
FIG. 4. Is an example of the voting part, or the voting portion of the ballot, with a printed-on file name consist of the Primary Identification number plus three-digits, to allow voting the ballot only one time.

The different illustrative embodiments recognize and take into account different considerations. For example, the different illustrative embodiments recognize and take into account that in elections, currently available voting procedures are unsuitable and, in an effort, to keep the vote anonymous, there is uncertainty about the results of the election. Also, there is no way for the voter to verify that his/her vote is correctly counted.

Chapter 1

Voter Registration.

A new proposed voting system 1 allows the voter to register in person or online in the State Voter Database. The new proposed voting system is flexible and accepts any proof of citizenship 2 including but not limited to U.S. Passport, U.S. Certificate of Naturalization, or U.S.

Certificate of Live Birth. The new proposed voting system is flexible to accept any proof of permanent residency 4 including but not limited to U.S. State Driver License, Drivers Permit, or State Voter Registration Card 3. The proposed new voting system 1 is flexible and accept all currently used voting methods 6 including but not limited to voting in person or voting by absentee ballot 5. The registered voter may request an absentee ballot voting application 7 for good reason and including but not limited to military service, the voter physically is unable to vote in person, or the voter is working at a remote location away from the primary residence of the voter. The proposed new voting system 1 does not allow the use of the currently accepted Mail-In voting system including using unsolicited ballots. The proposed new voting system uses a unique Serial Number 9 printed on the Removable Stub 11 of the Official Voting Ballot 13 to be used for Voter identification, cross referenced with the State Voter Database 15, containing the voter's primary residence to allow one and only one Voter to register for each registered Official Voting Ballot 13. A USA Voter Database 17 cross referenced with the State Voter Databases 15 allows each voter to be identified by the location of the primary residence to ensure each voter votes one and only in one State (where the primary residence of the voter is located.) It is noted that the voting system may work without establishing a USA Voter Database 17 or a partial Voter Database 19, including neighbor States only. It is highly recommended to create and maintain a USA Voter Database 17 system with US Voter Identification Card 21 provided for each voter respectively. This will ensure an election system where each voter can vote in only one State, (where the primary residence is located.) The US Voter Identification Card 21 is a proof of citizenship and has a unique voter identification number 23, citizenship 24, a five-year expiration date 25, signature 27, a picture identification 28, and list the location of the primary residence 29, etc. The voter is required to maintain the primary residence location 29 and if changed, voter must return the old Voter Identification Card 21 to be destroyed and acquire at the same time a new Voter Identification Card 21 with the new updated primary residence address. The State 15 and the linked US Voter Database 17 will be updated automatically and kept current to enhance voter identification in the entire USA. This creates a unique list with numbers of the registered voters in the USA and all the 50 States respectively listed before every election. The primary residence location of the voter can be changed any time during the year except the day of the election, when it is prohibited.

Chapter 2

Mailing Out Ballots

Each Official Voting Ballot 13 has a Removable Stub 11 and a voting part 31 of the Ballot. The official voting ballot 13 is identified with a registered unique Serial Number 9 printed on the Removable Stub. The Official Voting Ballot 13 will be mailed out before the election day to the registered primary or absentee address (if applicable) of the registered voter. The ballot mailed to the residence address is a One-Way Mail Out Official Ballot 33 and the ballot mailed to the absentee address is an Absentee One-Way Mail Out Official Ballot 35. Each One-Way Mail Out Ballot 33 or Absentee One-Way Mail Out Official Ballot 35 has to be registered to one and only one Voter in the Voter Database. The Absentee Ballots 35 are sent to the absentee location specified by the Voter, with a secrecy envelope 37 and return envelope 39, containing the One-Way Mail Out Official Ballot 33. The absentee voter responsibility is to fill out the One-Way Mail Out Official Ballot 33, place it in the secrecy envelope 37, seal it, sign it, if necessary, in front of witnesses. The absentee voter will then specify, by placing the signed secrecy envelope 37 containing the filed out official ballot 33, into the return envelope 39, addressed to the name of the proxy voter who will vote in person on the behalf of the absentee voter, on the day of the election, at the voting location specified by the primary address of the absentee voter. The person elected to vote by the absentee voter is responsible for the validity of the absentee vote cast. The absentee ballot can be accepted by valid signature only. Dead man cannot vote, etc. No Ballot Harvesting is allowed, the voting is In-Person only on the election day, at the specified location, including the Absentee One-Way Mail Out Official Ballot 35 as well.

Chapter 3

Filling Out the Ballots

The voter creates a unique Primary Voter Identification number 41 on the Removable Stub 11 which will create a unique relationship between the Removable Stub 11 containing the unique Serial Number 9 registered to the Voter in the Voter Database, and the voting part 31 of the One-Way Mail Out Official Ballot 33. This Primary Voter Identification Number 41 is unique to the voter and will be used to establish the primary search engine in the Voting Database 43, allowing the voter to search the Voting Database 43 for Votes cast. The Primary voter identification number 41 is created by the voter as they vote and is therefore anonymous and untraceable back to the voter. Only the voter knows their number and can look to make sure their vote was registered and counted and not changed. The number of digits of the Primary Voter Identification number 41 are the same as the number of digits of the Serial Number 9 on the Removable Stub 11. The Primary voter identification number 41 is recorded on the voting part by filling in the bubble 44 associated with the numbers and is recorded on the removable stub 11 by being handwritten.

An additional security feature may be a unique Six-Digit Secondary Graphical Identification Number 45 using numbers and letters handwritten right through the perforated space 47 between the Removable Stub 11 and the Voting part 31 without raising the pen. The letters and numbers being partially on the removable stub and partially on the voting part. This will create an unbreakable relationship between the Removable Stub 11 and the Voting part 31 identifying one and only one Voter for each Voting Ballot respectively, after the Vote cast.

Record the votes using a pen for each item on the Voting Ballot on the space provided for the coded vote numbers 55 on the removable stub 11. This is done by transferring the vote item by item onto the Removable Stub using a pen, recording 1 for the first, 2 for the second, 3 for the third selection of items voted on, and so on, for each voting item respectively. This will be used to check the votes in the Voting Database 43 and compare the votes generated by the Voting Machine were counted correctly. In this system no repair on the Voting Ballot 31 is allowed, for instance, crossing out a vote and mark another vote to replace it. This could be performed by anyone and negates all the security previously described. Also, no replacement One-Way Mail Out Official Ballot 33 provided, irrespective of errors, one and only one registered One-Way Mail Out Official Ballot is registered to one and only one Voter respectively.

Chapter 4.1

Identification at Voting Location:

Using Registered One-Way Mail Out Official Ballot:

The proposed Voting System will allow only in person voting, at the specified voting locations, using completely filled out One-Way Mail Out Official Ballot 33 to make the voting process efficient. Please note the Removable Stub 11 is a must to be still attached to the Voting Ballot 31 at the voter identification stage and/or location. Scan in the registered Serial Number 9 printed on the Removable Stub 11 of the One-Way Mail Out Official Ballot 33, to pull up the registration data for the Voter at the Voting Location, matching the Serial Number on file in the State Voter Database, to ensure one and only one ballot is used and registered to one and only one Voter, and initiate an automatic voting number count, and initiate the system to register and activate the Voter Registration Data in the system as a valid data. The system then inactivates the unused Voter Registration Data attached as unused data to the voter identity and it is ready to be purged after the election, to clean out the Voter Database. Identify the Voter at the voting location using the accepted documents valid for getting government identification. This may vary state by state. Voter Identification Card 21 is a must.

It may be necessary to check the physical signature of the voter at the voting location based on the voter signature on file in the Voter Database and with at least one personal identification document including but not limited to driver's license, US passport, Naturalization Certificate, Voter Identification Card, etc. As the final step it may be necessary that the one-way official Voting Ballot 33 is stamped with a "Checked In" stamp through the space on both sides along the perforated space 47 between the Removable Stub 11 and the Voting part 31 to avoid voter fraud. Please note: the removable stub is still attached at this point.

Chapter 4.2

Identification at Voting Location:
Using Registered Absentee One-Way Mail Out Official Ballot 35:

Using the unopened secrecy envelope 37, identify the absentee voter at the voting location using signature identification. Open the secrecy envelope 37 and remove the One-Way Mail Out Official Ballot 33 from the envelope with the removable stub 11 still attached, and check that the ballot is completely filled out and ready to cast. Using the return envelope 39 identify the proxy voter who is selected to cast the vote on behalf of the absentee voter at the voting location, on the day of the election, at the location specified by the primary address of the voter. The proxy voter will follow the procedure outlined for the One-Way Mail Out Official Ballot 33, for instance, Scan in the registered Serial Number 9 printed on the Removable Stub 11 of the One-Way Mail Out Official Ballot 33, to pull up the registration data for the Voter at the Voting Location, matching the voter ID Number 23 on file in the State Voter Database 15 etc. The final step the Voting ballot is stamped with a "Checked In" stamp 49 through the perforated space 47 defined as both side along the tear of perforation line between the Removable Stub 11 and the Voting part 31, and an "Absentee" stamp 51 on the Removable Stub 11 only to avoid voter fraud.

Chapter 5

Final Voting

The One-Way Mail Out Official Ballot 33, and/or the Absentee One-Way Mail Out Official Ballot 35 are identical at this stage. The Removable Stub 11 will be detached from the Voting Ballot 13 by one of the bipartisan employees working at this Final Voting stage and will locate it into a dedicated receptacle of the Voting Machine using a stay away zone specified for the Serial Number 9 of the Removable Stub 11 with the intent to secure the data from a possible voter identification breach. The Voting Ballot 31 will be placed in the Voting Machine simultaneously and to ensure only one Removable Stub 11 and only one Voting Ballot 31 of the same One-Way Mail Out Official Ballot 33 is placed into the voting machine simultaneously.

The Voting Ballot 31 will be processed through the voting machine, transferring all voting data from the Voting Ballot 31 back to the Removable Stub 11 and to the State Voting Database 43 simultaneously, included but not limited to the Name, Date/Time, Type, Size of the PDF file containing the scanned in lower half of the Secondary Graphical Identification number 45, the Primary Identification number including the Three-Digit consecutive counting number 57, and all Coded Voting numbers 56 for each candidate or proposition. The removable stub 11 has a section for coded vote numbers 55 that are handwritten input by the voter and below it the voting machine will put in the machine entered numbers 56 which can be compared to the voter's intent. The removable stub 11 will also have the handwritten data of the Primary Identification Number 41 already filled in by the Voter using a pen, which will allow the Voter a quick check that the data read into the Voting Database 43 and printed on the Removable Stub 11 is identical with the intent of the Voter, as well as to eliminate any human error made by the Voter writing the numbers by hand. This will also serve as a proof test that the voting machine accurately recorded the votes to the Voting Database 43 and on the Removable Stub 11. It is then possible to verify the votes are counted accurately, using a possible post-election voting check as needed.

In addition to the data transferred already to the Removable Stub 11 and into the Voting Database 43 the following data will be transferred at the Voting Location to the Voting Ballot 31 including but not limited to the Name, Date/Time, Type, Size of the PDF file containing the scanned in lower half of the Secondary Graphical Identification number 45, to ensure the Voting Ballot 31 cannot be scanned again. The scanned in file name 57 (for example PDF) will consist of the Primary Identification Number 41 followed by a Three-Digit consecutive counting number, starting with 001 and ending with 999, to be used to mark each Voting Ballot 31 at the final voting stage, in case the same Primary Identification numbers 41 are randomly chosen by multiple voters to identify their Voting Ballots 31. In the example in the figures, this number would be between "403918001.pdf" and "403918999.pdf", and these files are saved in a numerical sequential order to prohibit duplicate file names, and for easy vote identification. In addition, the scanned in file name 57, will have an attached letter "F" for front, and "R" for rear for which side of the voting ballot 31 is shown. This will help resolve any dispute regarding the validity of the voting data. In the example figures these files will be 403918001F and 403918001R, and can be recorded on a memory stick as well for the Voter. In addition, the data transferred to the Voting Database 43 and to the removable stub 11, these files will be recorded as a *.pdf file in the Voting Database 43 and on a memory stick for the Voter.

The absentee votes counted the same time as the regular votes. Also, the voter has the capability to check the votes in the Voting Database 43 and may file a complaint in a case where the votes recorded differently than the voter intent. This is possible because the ballots can be identified, and the voter can prove that the votes on the ballot are correct or incorrect. In addition, each mayor party like the Republican and Democrat parties may create a secondary database and populate it using the data recorded on the removable stub 11 of the One-Way Mail Out Official Ballots 33 to verify the state database accuracy if needed. There was a claim in 2020, that votes were changed internally electronically in the Voter Data Base, which in our case could be checked easily.

Chapter 6

Final Voting Report

The final Voting Database includes but not limited to the Primary Identification Numbers as a primary search engine, the State of Voting, the Voting District, the Coded Vote Numbers, and the scanned in PDF file of the lower half of the Six-Digit Secondary Graphical Identification Number 45 as the secondary search engine verification. The Voter can use any PC to access the final Voting Database 43 and using a built-in search engine window, search for the Primary Identification number, the State, and the Voting District, to access the Coded Vote numbers 56.

Figure 9:
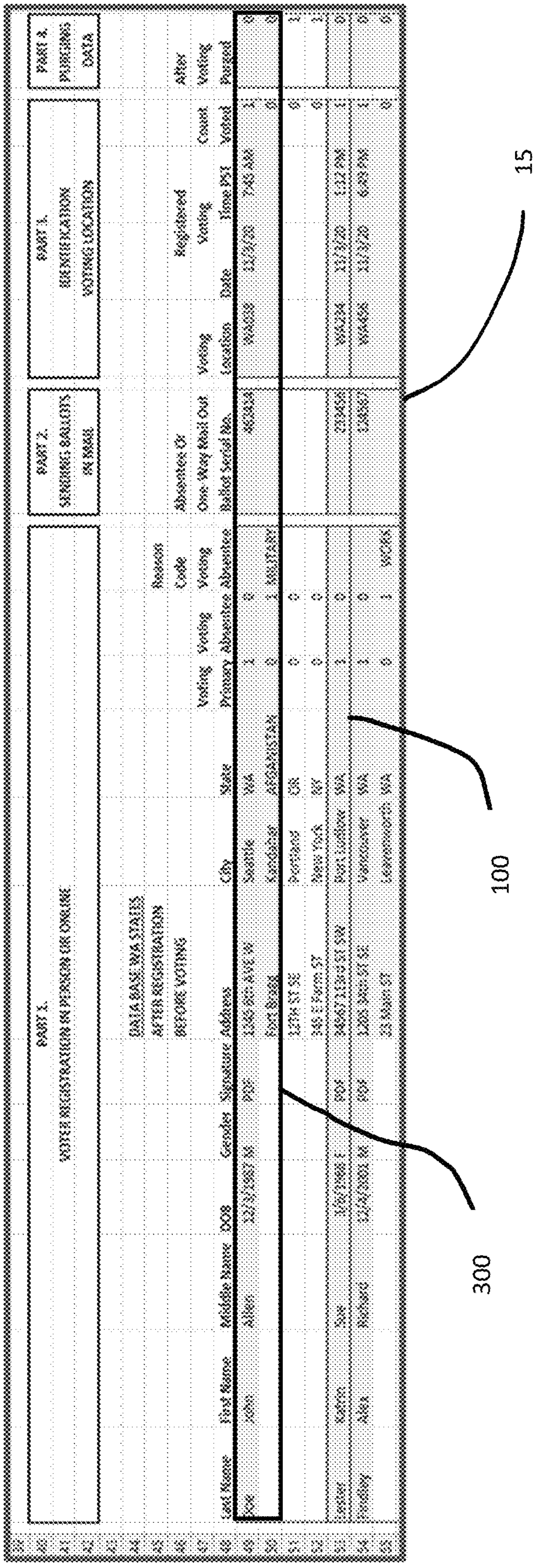
FIG. 9. Is and example of the state voter database showing an in-person voter and a person needing an absentee ballot.

It is recommended to type in the scanned file name 57 digit by digit waiting until the results are less than can be showed on one full screen to avoid tracking voters, and to protect the voter identity. The Votes will be counted and tabulated in the Voting Database 43 by Coded Vote Numbers based on election items on the Voting Ballot. Any mistake on the voter's side will be locally identified and rejected by a "0" to show the voter selected two or more answers, no answers, incorrect selection for one question, the rest of the Voting Ballot is accepted and tallied as a legitimate vote for each correct vote. The PDF or image file of the remaining lower half of the Six-Digit Secondary Graphical Identification Number 45 may be used as a secondary search item to verify the ballot cast by the voter in case the Primary voter Identification number 41 is used by another ballot or ballots as well. By selecting the Voter Primary Identification number 41, the Coded Vote numbers 55 show the intent of the voter. For example, if there were twenty-seven items to vote on, the Coded vote number 55 would be twenty-seven digits long and each digit would identify the voter's intent. The voters intent would be a digit from 1 to 9 correlating to what was selected by the voter. For example, if the question was for approve or reject then, the 1 would mean approve the 2 would mean reject. If there were three candidates for the position then, the first would be 1 the second 2 and the third person to select would be 3 and so on. If the numbers in the Voting Database 43 are not matching the selection of the Voter it is easy to identify the voter's intent from the PDF or image file and change the voting tally in the election without running a recount or reelection. The count of the votes will be finished at the closing of the voting location but no later than midnight on election day, and the Voting Database will be locked no later than midnight on election day. No other ballots and votes will be counted after midnight of the election day, including absentee ballots. The fraudulent votes could be easily identified and rejected by the voters or by the staff, for instance no down ticket, or same ballot scanned in the voting machine multiple times. It is easy to detect them and remove them by sorting the database using the Reconcile column 59, see FIG. 9 showing an "R" for reconcile, and "X" for removal. At this time, the database is locked, no permanent data removal allowed. Only a secondary data base 61 can be used to correct the results of the locked primary data base 43 to prevent voter fraud. Since there is a relationship 14 established between the Voting Database 43, the Removable Stub 11 using the Serial Number 9, and the Voting Ballot 31 using the Primary 41 and Secondary Graphical Identification numbers 45 each of the ballots can be identified through a canvassing process, ensuring only legal votes cast are counted.

The votes are tallied continuously during the election and reported to the headquarter time to time. The Coded Vote Numbers are available at the close of the voting place immediately physically, electronically, and accurately. Electronic and hard copies are available of the Voting Ballots at each voting location making it very simple to reconcile the number of votes in the system compared to how many people checked in, voted, and how many ballots are collected.

Chapter 7

Purging Unused Voter Registration

To avoid fraud, it is necessary to automatically purge voters and/or unused addresses of the voters from the State Voter Database 15, whose voter registered Official Ballot Serial Number 9 was not identified and/or used at the Voter Identification step of the State Voting process. This avoids repeatedly sending out registered Official Ballots at each election to voters that are inactive, relocated, dead, etc. Enforcing the automatic purging process will obligate the voter to register using a primary address before each election and avoids having unidentified Official Ballots circulating. Proper voter registration as a necessary step to avoid voter fraud. Each Official Ballot Serial Number 9 must be registered to one and only one voter.

It is the State's responsibility to keep the location of the primary residence of the voter intact and accurate in the State Voter Database 15, cross referenced with the USA Voter Database 17 for all 50 States, to prevent voters from registering and voting in more than one state. This includes allowing only one primary residence, and absentee vote option for one and only one voter. The Voter Database is cleaned and purged after the election respectively, to ensure only voters who cast legal votes remained in the Voter Database for the next election. People who did not vote in person or by absentee vote have to register again if they want to vote in the next election. This process will keep the Voting Database current and legal.

Chapter 8

Recount Using Voting Ballot and Removable Stub

The Voting Ballot 31 and the PDF Files of the scanned in lower half of the Six-Digit Secondary Graphical Identification number 45, with Name, Date/Time, Type, Size of the PDF file stored in the Voting Database 43, can be used to identify fraudulent votes and recount votes as a first iteration. The Removable Stub 11 with Coded Vote Numbers 56 printed on it, Primary Identification Number plus three-digits 57, and the PDF Files of the scanned in lower half of the Six-Digit Secondary Graphical Identification number 45, with Name, Date/Time, Type, Size of the PDF file stored in the Voting Database 43, can be used to identify fraudulent votes and recount votes as a secondary iteration. It should be noted to not use the recorded Serial Number 9 to identify Primary or Secondary Voting Database and voting data, because the link can reveal the identity of the registered Voter. The only time the Serial Number 9 may be used if it is necessary to create a link between the voter and the removable stub as a last resort to Identify the voter and the vote in the Voting Database in case of an obvious fraud. It is easy to test a Voting Machine accuracy and detect industrial fraud using a dedicated independent secondary high-tech equipment to register the voting data transferred from the Removable Stub 11 to a secondary database with a compare function to back check the data on the State Voting Database 43. This step normally is not needed if the system functions as designed, unless we are dealing with hacked primary database, with a criminal intent to change the election results purposely. By locking permanently, the database at midnight on the election day for the State and the Federal Database, any stuffed ballots can be identified and removed from the database easily by using a simple data compare and sort function between the databases in question.

Chapter 9

More Advantage of the Voting System

The current system in use can be easily adopted to this proposed new voting system without any fundamental changes. The regular and absentee votes are counted on the same time on the election day. The intension of the voter is secured and has full visibility to access the Voting Database 43 without identifying the Voter. The proposed new voting system ensure only legal votes cast and will count. Federal Voting Items can be placed on the Voting Ballot at every federal election asking the Voter to vote on items like balance budget agreement, close the south border, etc.

Chapter 10

Recall Advantage of the Voting System

The removable stub 11 can be used electronically to recall any item, or elected official in the Voting Database 43 without sending out new ballots, by simply identifying the Voter in the Voting Database 43 using the Primary Identification number, 57 and the scanned in Secondary Graphical Identification number 45 of the Removable Stub 11, and by removing the old Coded Vote value, 56 and replacing it with the newly recorded Coded Vote value 66, recorded in the Secondary Voting Database 61 and on the hand written Secondary Voting location 65 of the Removable Stub 11 as well. If using the voting machine to enter the recall vote, the voting machine will enter the machine entered secondary vote 66 in the row below the hand written secondary voting location 65. Using this system, it is not necessary to wait out the end of the term of an elected official, any elected position can be terminated at any time, including but not limited to the President of the USA. The votes can be changed by the voters at any time, using the removable stub 11 to initiate a change in the vote count, and recorded in a secondary modifiable data base 61 independent from the database 43 permanently locked at the election. This secondary database 61 counts the specific votes and if the number of the recall votes exceed the 50% of the total votes, then a new election will be initiated the following November. If the recall votes exceed the 60% of the total votes, then a new special election will be initiated immediately, not waiting for the next November election. With this function the voters have the power to recall any elected official simply by enforcing the will of the voters. The recorded changes in the secondary Voting Data Base 61 will be used only to collect voter's data and evaluating it to prepare another election term needed to ratify officially the will of the voters, by the next election scheduled. This can be used in cases where the elected official did not disclose important information before the election or impose potential harm to the country like being compromised by entities which may impose harm to the voters and the country.

Figure 5:
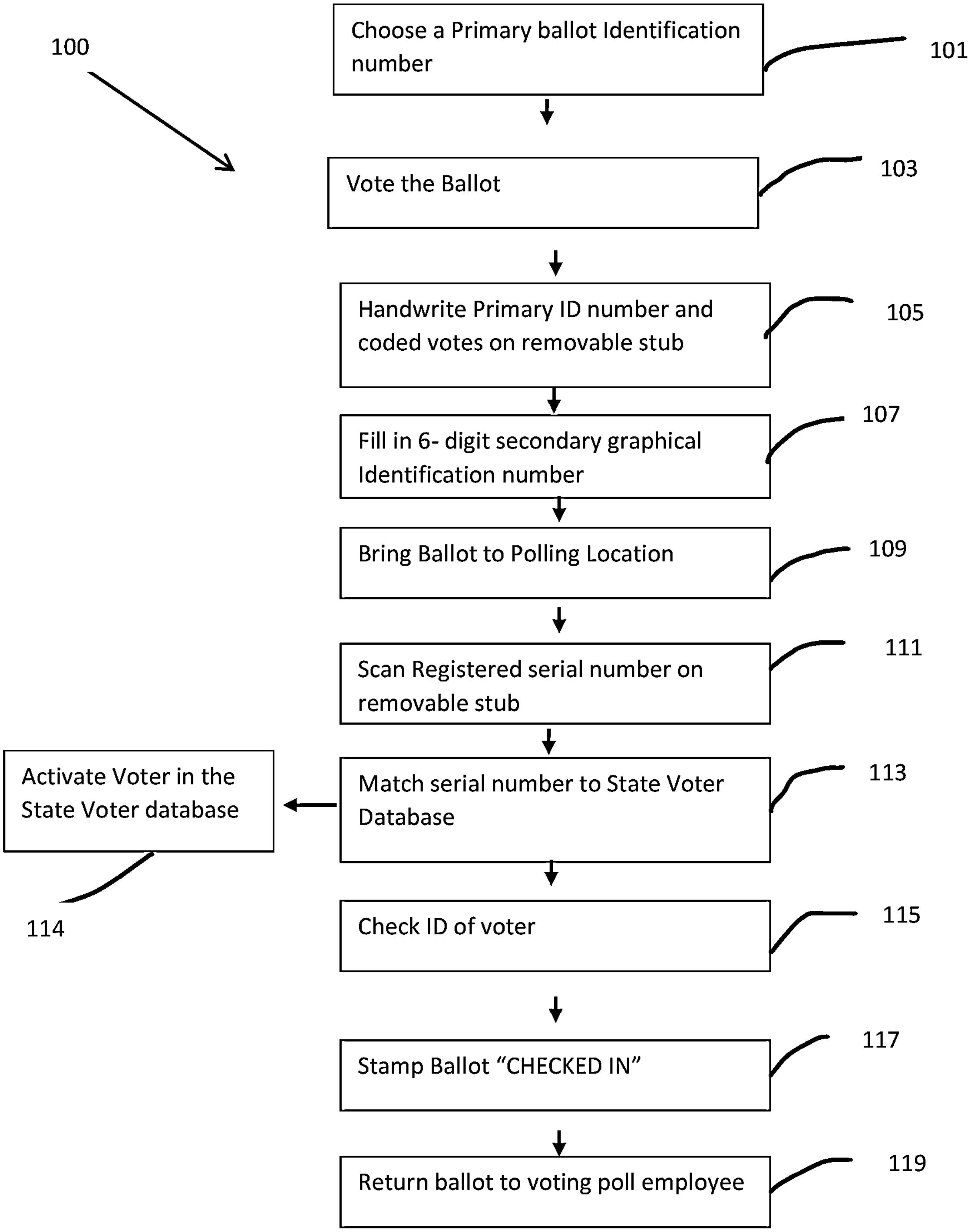
FIG. 5. Is a flow chart of the process for voting a one-way official mailout ballot.

FIG. 5 is a flow chart of a method for securely voting 100. The method provides a secure and current voter registration system 1 and verifies that the votes are counted correctly using a portion of a ballot and then and recording all registered voters on a state primary voter database 43. The ballot or the one-way official mail out ballot may have two parts, the removable stub 11 and the voting part 31. Next the voter chooses a primary ballot identification number 101, votes the voting portion of the ballot 103, and handwrites the primary ballot identification number and the coded votes on the removable stub 105. The voter may then fill in the 6-digit secondary identification number in the space provided between the removable stub and the voting portion 107. The method of securely voting 100, initiates with bringing a finished ballot in person to a polling location 109. That person then scans the registered serial number in a removable stub 111 which matches the serial number to the State voter database 113, and activating the voter in the state voter database 114. Next the Poll worker checks the identification of the voter 115, to make sure it matches the ballot and stamps the ballot "CHECKED IN" 117, and return ballot to a polling location employee 119.

Figure 6:
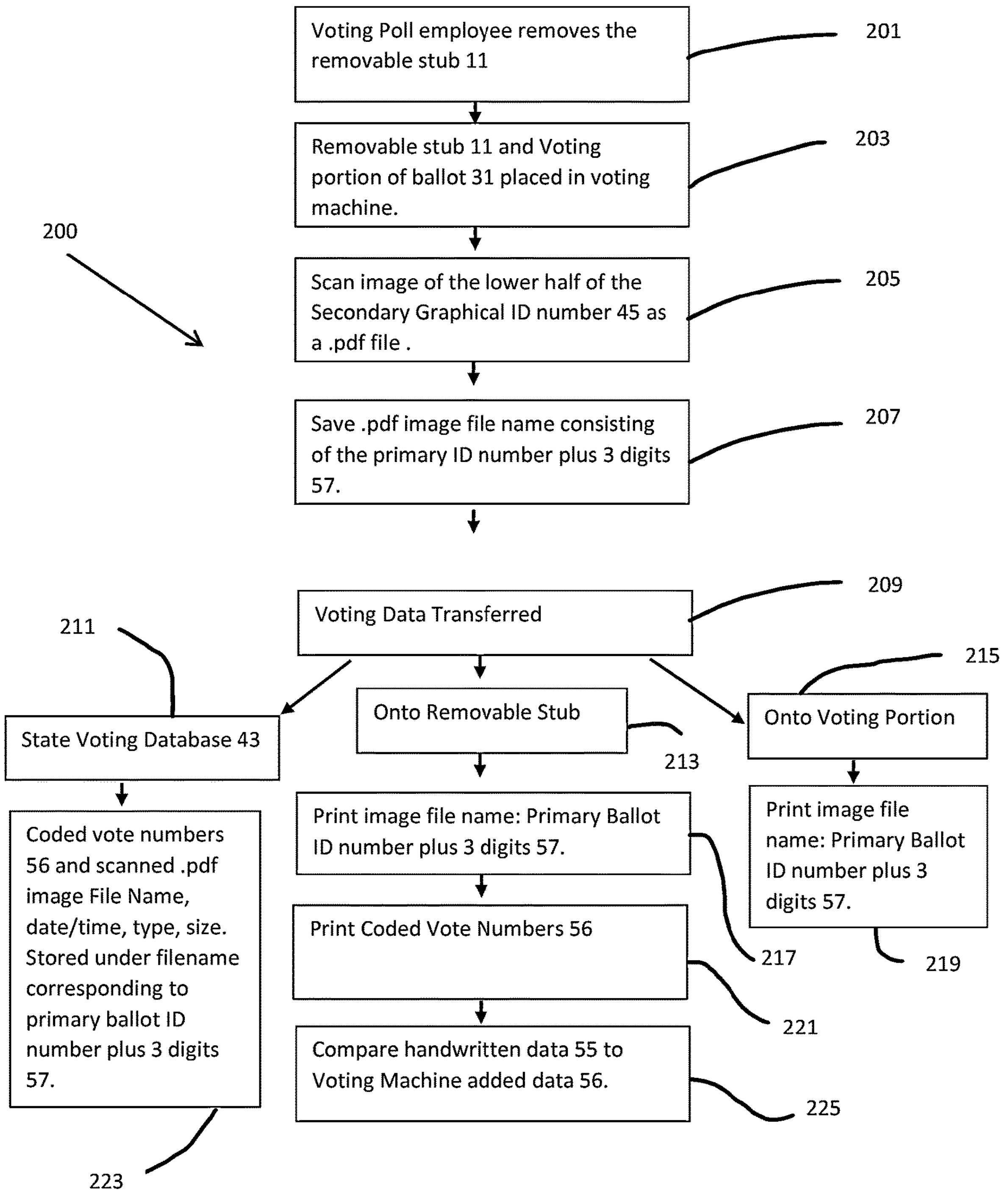
FIG. 6. Is a flow chart of the final voting and data transfer of an already checked in one-way official mailout ballot.

FIG. 6 is the part of the secure voting process for recording and storing the vote 200. A poll worker removes the removable stub 201 and places the removable stub and the voting portion in a voting machine 203. Then using the Voting portion, the voting machine scans in the image of the lower half of the Secondary Graphical Identification Number as a PDF file 205, saving the PDF image file under a file name consist of the Primary Identification Number and three digits 207 in case the Primary ballot ID Number is not unique. For example, the first use of the primary ballot ID number 403918 would get the file name 403918001 or the primary ballot ID number plus 001. The second use the same Primary ballot ID number would be 403918002 or the primary ballot ID number plus 002.

Next the voting data would be transferred and stored 209 in the state voting database 211 under the created filename consisting of the primary voter ID number plus 3 digits 223, including but not limited to coded vote numbers 56, Secondary Graphical image PDF file, with Name, Date/Time, Type, Size. Next the voting machine transfers the voting data 209 from the voting portion of the ballot to the removable stub 213, including the coded vote numbers 221, the image file name 217, which consist of the Primary Identification Number and three digits, followed by a step to compare handwritten data to the Voting Machine added data 225. Next the voting machine transfers the voting data 209 from the voting portion of the ballot back to the voting portion of the ballot 215, including the image file name 219 consist of the Primary Identification Number and three digits.

Figure 7:
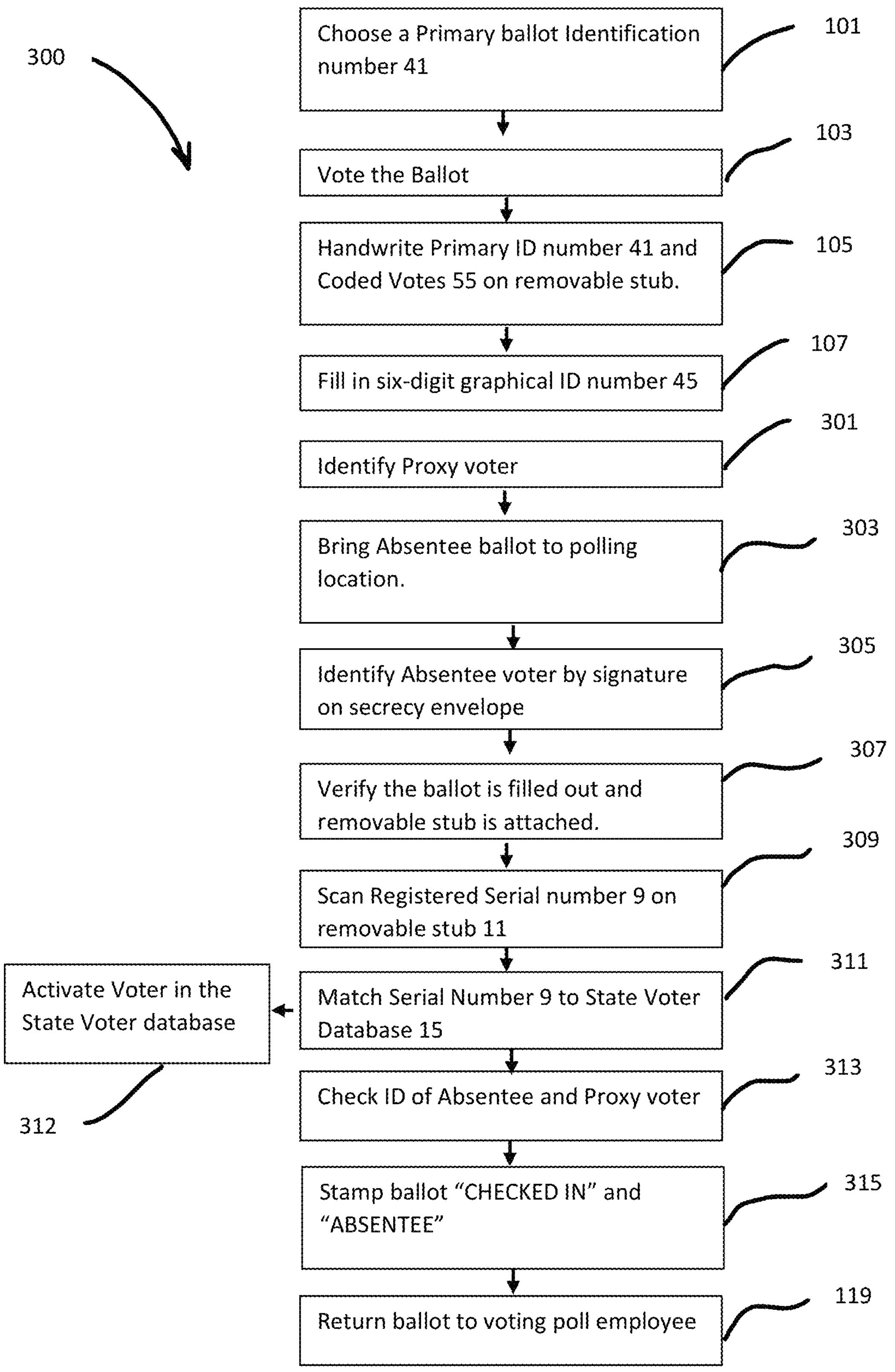
FIG. 7. Is a flow chart of the process for voting on an absentee ballot.

FIG. 7 is the flow chart of the method of securely absentee voting 300. Next the absentee voter chooses a primary ballot identification number 101, votes the voting portion of the ballot 103, and handwrites the primary ballot identification number and coded votes on the removable stub 105. The voter may then fill in the 6-digit secondary identification number in the space provided between the removable tab and the voting portion 107. Choosing a primary ballot identification number comprises filing in bubbles corresponding to the primary ballot identification number on a voting portion 31 and handwriting the numbers on the removable stub 11 to create a secret link between the voting portion and the removable stub. The handwriting a Secondary Graphical Identification Number step 107 comprises writing numbers or letters through a perforated space between the removable stub and the voting part resulting in the secondary graphical identification number being partially on the removable stub 11 and partially on the voting part 31. The absentee voter will then identify a proxy voter 301 who will go the polling location on election day and vote the ballot 303. The first step is identifying an absentee voter by signature comparison on a secrecy envelope 305, and verify that the ballot is filled out and a removable stub is attached 307. The poll worker will then scan the registered serial number in the removable stub 309 and matching the serial number to the state voter database 311 and then activate voter in the state voter database 312. The poll worker will then check the ID of the absentee and proxy voter 313, and stamp the ballot "CHECKED IN" and "ABSENTEE" 315, and return the ballot to a polling location employee 119.

Figure 8:
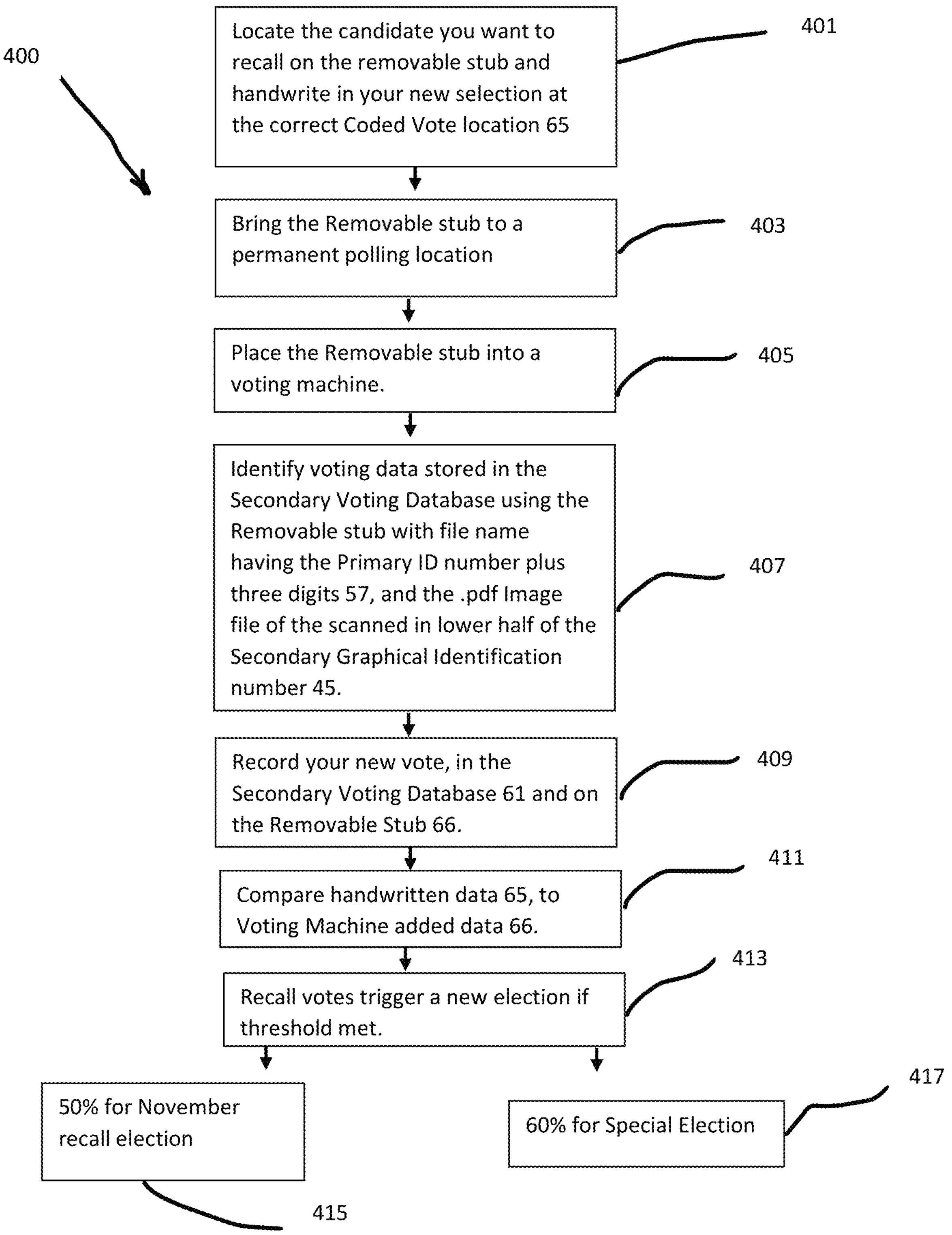
FIG. 8. Is a flow chart for the process of recall voting in the secondary voting database.

FIG. 8 is the final portion of the method of securely voting which is the method of recalling a candidate 400. Locate the candidate you want to recall on the Removable Stub 11, and write in your new selection using a pen at the correct Coded Vote number location 65, 401. Bring the Removable Stub 11 to a permanent Polling Location 403. Place the Removable Stub 11 into the Voting Machine 405. Identify the voting data stored in the Secondary Voting Database 61 using the removable stub 11 with file name consist of the Primary Identification Number plus three digits 57, and the PDF file of the scanned in lower half of the Secondary Graphical Identification Number 45, 407. It should be noted to not use the recorded Serial Number 9 to identify Secondary Voting Database and voting data, because the link can reveal the identity of the registered Voter. Next record your new vote 66, in the Secondary Voting Database 61 and on the Removable Stub 11, 409. Compare handwritten data 65 to Voting Machine added data 66, 411. Recall votes trigger a new election if threshold met 413. If 50% of voters vote for the losing candidate in the secondary voter database it will trigger a new November recall election 415. If 60% of voters vote for the losing candidate in the secondary voter database it will trigger a special election 417.

FIG. 9 is an example of the state voter database 15 showing the voter registration data for every legal voter in the state. Voter who are inactive will be purged. Voters that are absentee will follow the secure absentee voting 300 process. Voters who are not absentee will follow the secure voting 100 process.

Figure 10:
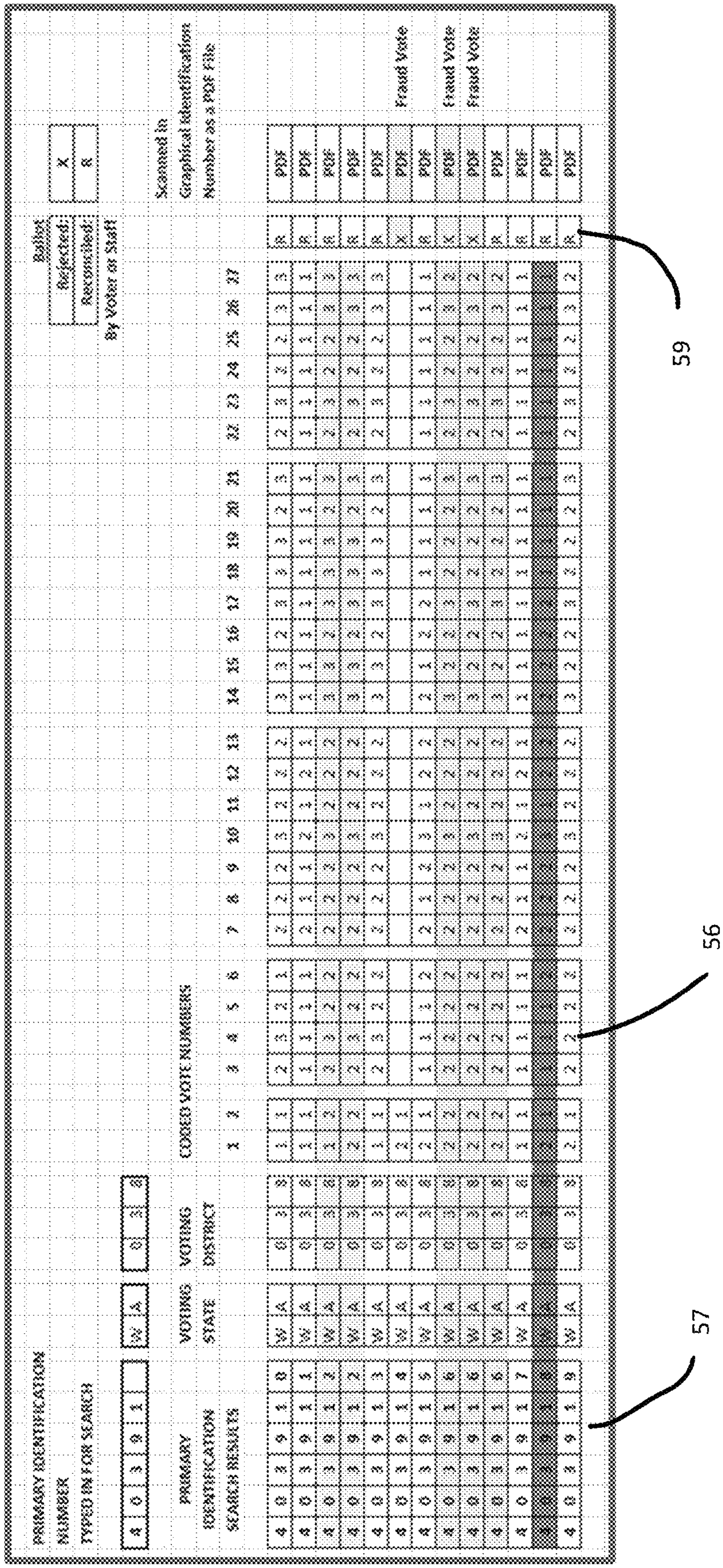
FIG. 10. is an example of a Primary voter database showing the primary ballot identification numbers and the votes cast for each ballot.

FIG. 10 is the primary voting database 43 with the results from the polling machine entered in and categorized by Primary ballot identification number 57. The coded voting numbers 56 are shown as they were understood by the polling machine. The reconcile column 59 is where the machine decides if the ballot is fraudulent (marked with an X) or reconciled (marked with an R). The ballot could be fraudulent because it had been run through the polling machine multiple times.

The invention claimed is:

1. A secure voting system comprising,
a secure and current voter registration system,
a ballot having a means for verifying that the votes were counted correctly,
the ballot comprises a removable stub and a voting portion,
a state voter database comprising all registered voters, and
a Secondary Graphical Identification Number comprising numbers and letters handwritten through a perforated space between the removable stub and the voting portion wherein,
the secondary graphical identification number being partially on the removable stub and partially on the voting portion.

2. The secure voting system of claim 1 wherein,
the registration system requires proof of citizenship such as U.S. Passport, U.S. Certificate of Naturalization, or U.S. Certificate of Live Birth.

3. The secure voting system of claim 1 wherein,
the registration system requires proof of permanent residency such as State Driver License, Drivers Permit, or State Voter Registration Card.

4. The secure voting system of claim 1 further comprising,
in person voting or absentee ballot, wherein,
absentee ballots require a proxy voter to vote in person for the absentee voter.

5. The secure voting system of claim 1 further comprising,
a unique Serial Number printed on a Removable Stub of a voting ballot to be used for cross referencing with the State Voter Database to insure only one voter is register for each voting ballot.

6. The secure voting system of claim 1 further comprising,
a nationwide Voter Database including information from the State Voter Databases having each voter identified by their primary residence to ensure each voter votes once and only in the state of primary residence.

7. The secure voting system of claim 1 further comprising,
a partial Voter Database, including neighbor States only.

8. The secure voting system of claim 1 further comprising,
a nationwide voter database system further comprising,
a nationwide voter identification card wherein,
the nationwide voter identification card is a proof of citizenship and has a unique voter identification number, a five-year expiration date, a signature, a picture identification, and a location of primary residence.

9. The secure voting system of claim 1 wherein,
the removable stub and the voting portion both comprising a voter created primary ballot Identification number wherein,
the primary ballot Identification number will create a secret relationship between the removable stub and the voting portion, known only to the voter.

10. The secure voting system of claim 1 further comprising,
a space provided for handwritten coded vote numbers on a removable stub wherein, the coded vote numbers correspond to vote selection for each voting item on the ballot wherein,
a space is also provided for a machine entered voting number to ensure each vote was counted correctly by a voting machine.

11. The secure voting system of claim 10 wherein,
a file name is added the removable stub wherein,
the file name comprises a primary ballot identification number and three additional digits to distinguish from other identical primary ballot identification numbers, and
a file is created in the voting database reflecting the votes recorded and an image file of the voting ballot and stored under the file name.

12. A method for securely voting comprising,
providing a secure and current voter registration system,
verifying that votes are counted correctly using a portion of a ballot,
the ballot comprises a removable stub and a voting portion,
recording all registered voters on a state voter database, and
handwriting a Secondary Graphical Identification Number comprising numbers and letters through a perforated space between the removable stub and the voting portion wherein,
the secondary graphical identification number being partially on the removable stub and partially on the voting portion.

13. The method of securely voting of claim 12 further comprising, choosing a primary ballot identification number, voting the voting portion of the ballot, handwriting the primary ballot identification number and coded votes on the removable stub, fill in a six-digit Secondary Graphical Identification number, bringing the ballot in person to a polling location, scanning a registered serial number on the removable stub, matching the registered serial number to the state voter database and then activating the voter in the state voter database, returning the ballot to a polling location employee.

14. The method of securely voting of claim 13 further comprising, removing the removable stub, placing the removable stub and the voting portion in a voting machine, scanning an image of the lower half of the Secondary Graphical Identification number, saving an image file name consist of the Primary Identification number plus 3 digits in case the primary ballot ID number is not unique, adding Name, Date/Time, Type, Size to the Image file, transferring voting data from ballot to the removable stub, back to the voting portion, and to the state voting database.

15. The method of securely voting of claim 14 further comprising, recording a series of machine entered voting numbers on a space is also provided for handwritten voting numbers to ensure each vote was counted correctly by a voting machine.

16. The method of securely voting of claim 14 further comprising, identifying voting data stored in the Secondary Voting Database using the removable stub with file name consisting of the Primary ID number plus 3 digits, and the PDF file of the scanned in lower half of the Secondary Graphical Identification Number, changing an old coded number with a new coded vote number in the secondary voting database, and the removable stub, to signify a change in vote, triggering a new November recall election if 50% of voter change coded number or triggering a special election if 60% of voter change coded number.

17. The method of securely voting of claim 13 wherein, choosing a primary ballot identification number comprises, filing in bubbles corresponding to the primary ballot identification number on a voting portion and handwriting the numbers on the removable stub to create a secret link between the voting portion and the removable stub.

18. The method of securely voting of claim 12 further comprising, choosing a primary ballot identification number, voting the voting portion of the ballot, handwriting the primary ballot identification number and coded votes on the removable stub, filling in 6-digit Secondary Graphical Identification number, providing a proxy voter, bringing absentee ballot to Polling location, identifying an absentee voter by signature comparison on a secrecy envelope, verifying the ballot is filled out and a removable stub is attached, scanning registered serial number in a removable stub, matching the serial number to the state voter database and then activating the voter in the state voter database, checking ID of Absentee and Proxy Voter, stamping Ballot “CHECKED IN” and “ABSENTEE” returning the ballot to a polling location employee.

* * * * *